United States Patent [19]

Nimmersjö et al.

[11] Patent Number: 4,731,688
[45] Date of Patent: Mar. 15, 1988

[54] RANGE LIMITATION FOR A PROTECTION DEVICE IN A POWER SUPPLY NETWORK

[75] Inventors: Gunnar Nimmersjö; Murari M. Saha, both of Västerås, Sweden

[73] Assignee: Asea AB, Sweden

[21] Appl. No.: 30,448

[22] Filed: Mar. 27, 1987

[30] Foreign Application Priority Data

Apr. 8, 1986 [SE] Sweden .............................. 8601566

[51] Int. Cl.⁴ .............................................. H02H 3/38
[52] U.S. Cl. ........................................ 361/65; 361/80; 361/86; 364/483; 324/522
[58] Field of Search ....................... 361/42, 44, 45, 47, 361/62, 65, 79, 80, 86, 66, 81; 364/483; 324/509, 512, 522

[56] References Cited

U.S. PATENT DOCUMENTS

| | | | |
|---|---|---|---|
| 3,629,658 | 5/1970 | Helge | 361/794 |
| 4,342,063 | 7/1982 | Thörnell | 361/79 |
| 4,352,136 | 9/1982 | Ericksson | 361/79 X |
| 4,426,670 | 1/1983 | Ilar et al. | 361/65 X |
| 4,591,992 | 5/1986 | Yamaura | 361/79 X |
| 4,636,909 | 1/1987 | Brandt | 361/80 |

Primary Examiner—A. D. Pellinen
Assistant Examiner—Derek S. Jennings
Attorney, Agent, or Firm—Watson Cole et al.

[57] ABSTRACT

A method and device for range limitation and direct tripping for protection in the event of a fault on an electrical power line extending between two stations (P, Q) involves employing a travelling wave model in one of the stations (P) which, with the aid of measured currents and voltages in that station, to calculate the voltage distribution at a number of control points along the line. The range of the protection device is indicated as the distance between the measuring station and that control point for which a voltage difference ($\delta u$) becomes equal to zero. The voltage difference consists of the difference between the absolute value of a voltage differene between the absolute value of a voltage difference ($\Delta u$), formed as the sum of a voltage value ($U''$) calculated with the travelling wave model for the control point at a certain time, and the corresponding voltage value ($U'$) one half-period earlier and the absolute value of the latter voltage value. When the voltage difference becomes greater than zero, direct tripping can be initiated.

3 Claims, 7 Drawing Figures

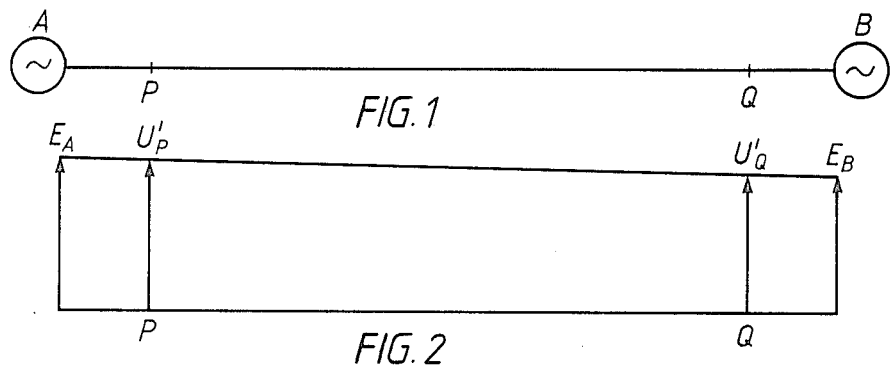
FIG. 1
FIG. 2
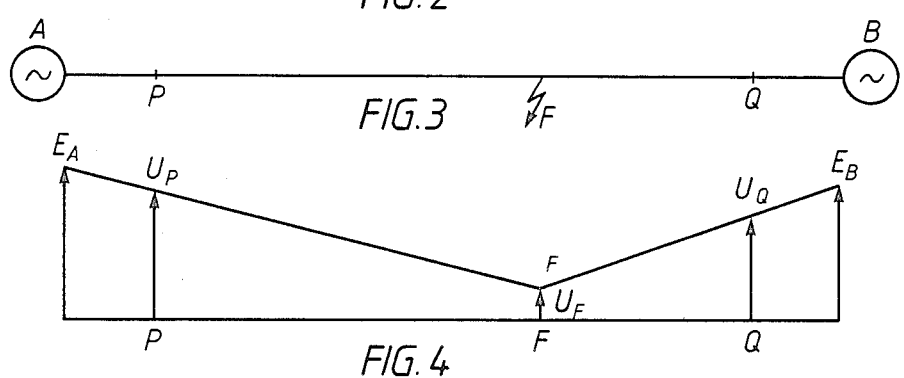
FIG. 3
FIG. 4
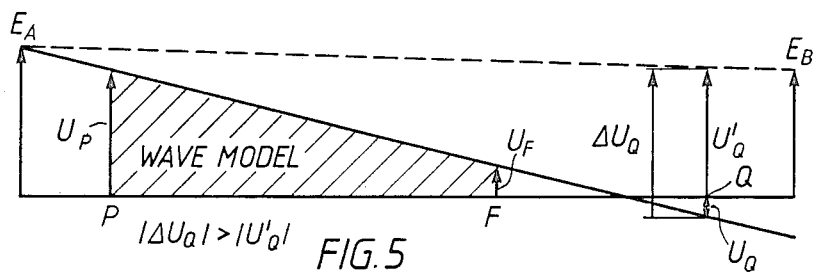
FIG. 5
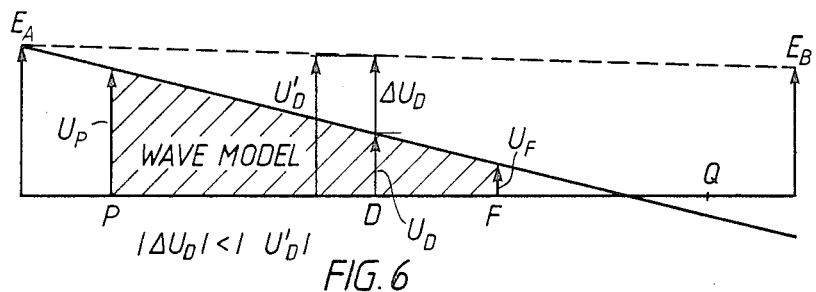
FIG. 6

RANGE LIMITATION FOR A PROTECTION DEVICE IN A POWER SUPPLY NETWORK

TECHNICAL FIELD

Protection devices in an electrical power supply and distribution network are normally capable of responding to a plurality of different types of fault. An impedance or distance protection device, for example, often has several properties, in addition to the impedance measurement capacity, which exercise a protective effect. These may be in the form of directional or range properties, and they may also be used to initiate means for overcurrent protection, or protection with absolute selectivity, as, for example, protection against oscillations arising in the network.

The present invention relates to a method and a device for range limitation and direct tripping in the case of a fault on the network.

BACKGROUND ART, PROBLEMS

The range properties and range limitation of an impedance protection device, according to the prior art, are related to the so-called model impedance which is directly or indirectly included in such protection devices. In the event of a load, the impedance of which falls within an impedance range determined with the aid of the model impedance in an R-X plane, this is assumed to imply a fault on the network. The range properties are then coupled to the resistance and inductance values of the model impedance, which values can be adjusted individually. This then means that the impedance range which implies a fault on the network may have different shapes. A protection device based on this principle and with analog components is described, inter alia, in U.S. Pat. No. 3,629,658 (Helge, Johansson). This protection device includes, among other things, analog filters, which have limitations in the area of selectivity and in their speed of action. The provision of the desired protective function characteristic, among other things range limits, may be a difficult problem due, for example, to the frequency dependence of the components included.

U.S. patent application Ser. No. 696,634, filed on Jan. 30, 1985 in the name of Brandt, also describes a protection device based on the same principle but designed with digital components.

SUMMARY OF THE INVENTION

According to the invention, a method and device for range limitation and direct tripping for protection of power supply equipment in the event of a fault on an electrical power line extending between two stations (P, Q) involves employing a travelling wave model in one of the stations (P) which, with the aid of measured currents and voltages in that station, is used to calculate the voltage distribution at a number of control points along the line. The range of the protection device is indicated as the distance between the measuring station and that control point for which a voltage difference ($\delta u$) becomes equal to zero. The voltage difference consists of the difference between the absolute value of a voltage difference ($\Delta u$), formed as the sum of a voltage value ($U''$) calculated with the travelling wave model for the control point at a certain time, and the corresponding voltage value ($U'$) one half-period earlier and the absolute value of the latter voltage value. When the voltage difference becomes greater than zero, direct tripping can be initiated.

BRIEF DESCRIPTION OF THE DRAWINGS

The invention will now be further described, by way of example, with reference to the accompanying drawings, in which:

FIG. 1 shows a power transmission line in a faultless state between two stations P and Q which are energised from two power sources A and B, FIG. 2 shows the measured voltage distribution, or the voltage distribution calculated with a travelling wave model, along a line according to FIG. 1, FIG. 3 shows the power line of FIG. 1 when a fault F has occurred between the stations P and Q, FIG. 4 shows an example of the voltage distribution occurring along the line according to FIG. 3 when a fault has occurred at F, FIG. 5 shows a voltage distribution, calculated with a travelling wave model at P, along the line according to FIG. 3 when the line is subjected to a fault at F, FIG. 6 shows the same voltage distribution as in FIG. 5 with indication of a calculated voltage at a control point D.

DISCLOSURE OF THE INVENTION, THEORETICAL BACKGROUND, ADVANTAGES

Figure 7:
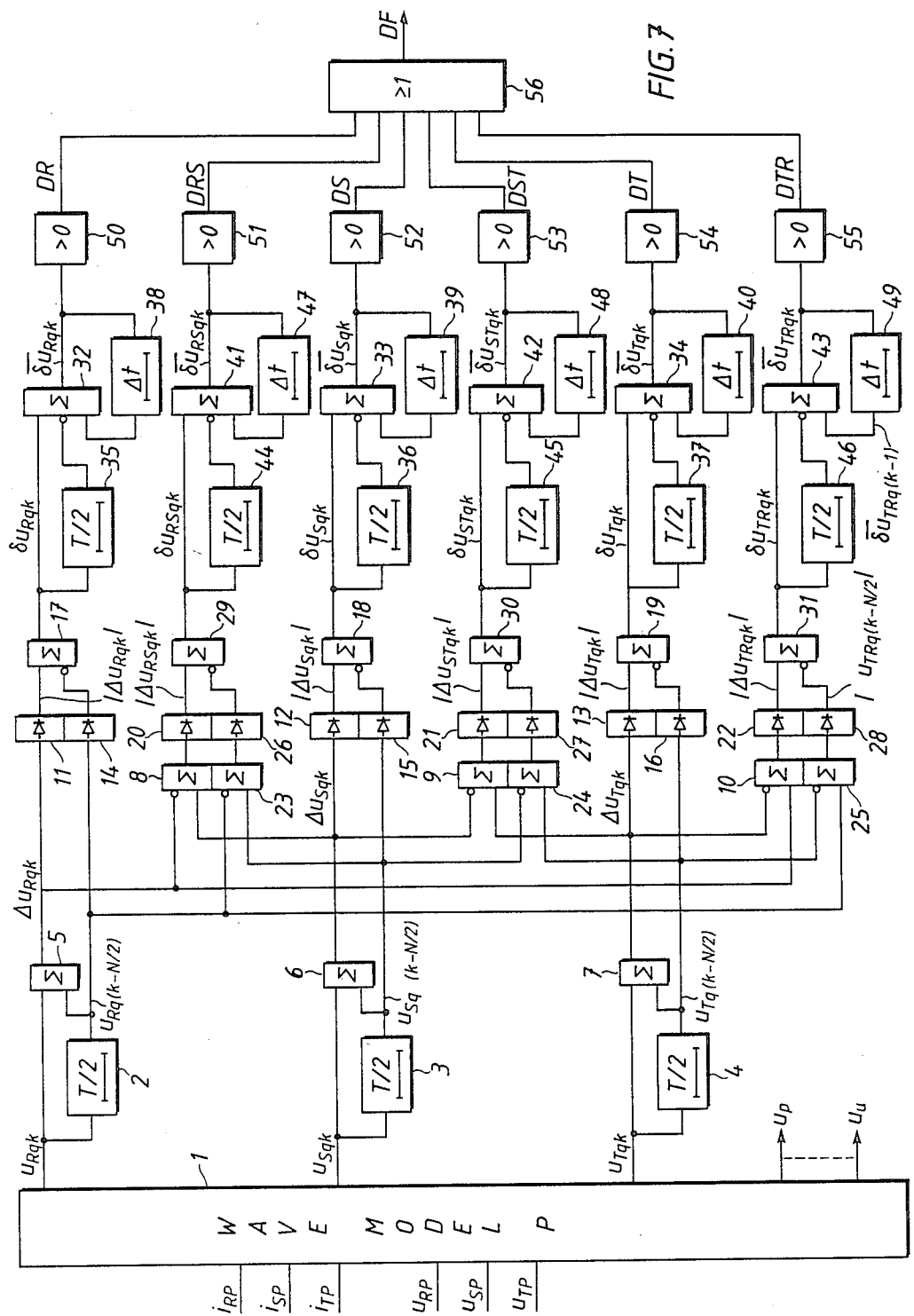
FIG. 7 shows, in schematic form, a device for carrying out a method according to the invention.

In an invention according to U.S. patent application Ser. No. 743,930, filed on June 30, 1985, in the name of Nimmersjö, a method and a device are described for locating a fault point on a line based on voltage waves emanating from a measuring point towards a fault point and the corresponding waves reflected from the fault point. The invention comprises carrying out, at certain regular time intervals, a measurement of the instantaneous values of the current and voltage at an end point of the line, for example at station P. With the aid of these values and a travelling wave model, the voltage at a number of control points along the line can be calculated. It is the travelling wave model described in U.S. patent application Ser. No. 743,930 that forms the basis of this invention, i.e. achieving range limitation in an impedance protection device and direct tripping in the event of a fault.

FIG. 1 shows an electrical power line extending between two stations or measuring points P and Q. In the illustrated case, the line is powered from two power sources A and B. The line PQ may be conceived to be a transmission line between two networks A and B, a line in a meshed network, or a line which connects a power station A with a power drain B.

FIG. 2 shows the real voltage distribution along the line in a faultless state. $E_A$ and $E_B$, respectively, are the emf's of the respective power sources and $U'_P$ and $U'_Q$, respectively, are the voltage measured at P and the voltage measured at Q, respectively.

With the aid of the current and voltage values measured in stations P and Q, control voltages or the voltage distribution from P and Q along the line and from Q towards P, respectively, can be calculated by means of the travelling wave model described in U.S. patent application Ser. No. 743,930. In a faultless state, this provides the same voltage distribution as in FIG. 2 within the limits determined by measurement errors, by errors in measuring value transformers and by uncertain parameter knowledge.

When the line according to FIG. 1 is subjected to an internal fault, i.e. a fault between points P and Q (see FIG. 3), a real voltage distribution such as that shown in FIG. 4 can be obtained, depending on the fault resistance, etc. The real, measured voltage at P and at Q is now designated $U_P$ and $U_Q$, respectively. The value of the voltage at the fault point, i.e. $U_F$, depends on the resistance at the fault point, which also influences the magnitudes of $U_P$ and $U_Q$.

A voltage distribution along the line, calculated with a travelling wave model in station P, is shown in FIG. 5. A comparison with FIG. 4 shows that the voltage distribution of the model is correct between P and F. It will now be shown that the voltage distribution calculated with the travelling wave model can be utilized, not only for the correct part of the voltage distribution, but also for the voltage distribution from F towards and beyond Q in accordance with this invention for range limitation and direct tripping in the event of a fault on the line.

With the aid of a travelling wave model at P, a measure of the voltage in station Q can be obtained, for example as an instantaneous value at a certain time t and the corresponding voltage one half-period earlier. Now, if, for the time being, the last measured voltage is designated $U''_Q$ and the preceding voltage one half-period earlier is designated $U'$, the voltage difference will be $$\Delta U_Q = U''_Q + U'_Q \tag{1}$$

and will be equal to zero in a stationary and faultless state.

When a new measured value becomes available, a new $U'_Q$ is formed from a stored measured value taken one half-period earlier than the new measured value, and the new measured value forms a new $U''_Q$. This shifting and updating take place continuously. When a fault occurs, the value of $\Delta U_Q$ will be different from zero.

With the aid of the absolute value of the voltage difference $\Delta U_Q$ and the absolute value of the voltage prior to a fault arising, i.e. $|U'_Q|$, the voltage difference is formed as follows $$\delta U_Q = |\Delta U_Q| - |U'_Q| \tag{2}$$

and it will now be clear from FIG. 5 that when $\delta U_Q$ becomes greater than zero, there is a fault between P and Q, i.e. an internal fault. On the other hand, the value of $\delta U_Q$ says nothing as to where on the line between P and Q the fault has occurred, since the value is also dependent on the fault resistance at the fault point F.

So far a purely general description of voltages at control and fault points has been made. It will be shown later on that the conclusions described are valid both with regard to phase voltages and with regard to principal voltages. To obtain manageable voltage values, it is convenient to utilise some characteristic measure of the voltages, for example in the form of mean values. This will also be described below.

As will have been clear from the above, the information that $\delta U_Q > 0$ can therefore be utilised, together with the information about the direction to the fault and after determination of the faulty phase or the faulty phases, for direct tripping of the circuit-breaker(s) in question.

In the case described, the protection device has a range which corresponds to the entire line section PQ. As will be clear from the above, the voltage along the line can be calculated with the travelling wave model at an optional number of control points along the line. A calculation of voltages at an intermediate control point D between P and Q according to FIG. 6 shows that $$\delta U_D = |\Delta U_D| - |U'_D| < 0$$

in the case of a fault at F. In this way, range limitatation can be obtained by choosing the control point for calculating $\delta U$. If a protection device with a range corresponding to PD is desired, a fault at F according to FIGS. 5 and 6 is a fault which lies outside the area of protection, and consequently a fault at F will not be remedied by action via station P.

The fundamental method described for direct tripping and range limitation, in order to operate in practice, must be described somewhat more extensively according to the following.

The previously mentioned voltage difference $\Delta U$ between the calculated voltage after a fault and prior to a fault is formed, as mentioned, as the instantaneous value of the voltage at a certain time t and the value of the same voltage one half-period earlier, i.e.

$$\Delta U = u(t) + u(t - T/2) \tag{3}$$

where T is the period. In a sample manner, for the k'th measurement per period $$\Delta u_k = u_k + u_{k-N/2} \tag{4}$$

where $N = T/\Delta t$ and $\Delta t$ = the time between the samples. The further treatment of the method as well as of a device for carrying out the method according to the invention is based on sampled measurement.

An adaptive filter, in the sense that N is determined with the aid of the zero passages of the preceding periods, can be used. In that case the influence of slow frequency changes upon oscillations is prevented.

Also, it is presupposed in the following description that the desired range for the protection device at P is the entire line section PQ.

The voltage difference in station Q, calculated in station P, according to equation (4) can then be expressed as $$\Delta u_{qk} = u_{qk} + u_{q(k-N/2)} \tag{5}$$

As will have been clear from the above-mentioned U.S. patent application Ser. No. 743,930, both phase voltages and principal voltages can be calculated with the travelling wave model. To indicate that the difference relates to one of the phase voltages, these may be indexed "$p$", i.e. equation (5) is changed into $$\Delta u_{pqk} = u_{pqk} + u_{pq(k-N/2)} \tag{6}$$

and, in a corresponding way, the principal voltage difference may be indexed "$p\sigma$" to indicate any of the principal voltages between phase RS, ST or TR, whereby esquation (5) is changed into $$\Delta u_{p\sigma qk} = u_{p\sigma qk} + u_{p\sigma q(k-N/2)} \tag{7}$$

To indicate the voltage difference according to equation (2) and indicate that it relates to any of the phase voltages R-S-T, index "p" is used in a corresponding manner, whereby $\delta u_{qk}$ relates to the k'th voltage difference of any of the phases calculated for the station or control point Q. Equation (2) is thereby transformed to $$\delta u_{pqk} = |\Delta u_{pqk}| - |u_{pq(k-N/2)}| \qquad (8)$$

The corresponding equation for principal voltages is $$\delta u_{p\sigma qk} = |\Delta u_{\sigma qk} - u_{pqk}| - |u_{\sigma q(k-N/2)} - u_{pq(k-N/2)}| \qquad (9)$$

To obtain manageable voltage differences, the mean value of the $\delta u$-values obtained is suitably generated. This ca be done, for example, by forming, respectively, $$\overline{\delta u}_{pqk} = \delta u_{pqk} - \delta u_{pq(k-N/2)} + \overline{\delta u}_{pq(k-1)} \qquad (10)$$

and $$\overline{\delta u}_{p\sigma qk} = \delta u_{p\sigma qk} - \delta u_{p\sigma(k-N/2)} + \overline{\delta u}_{p\sigma q(k-1)} \qquad (11)$$

Now, if any of the mean values $\overline{\delta u}$ according to equation (10) or (11) becomes greater than zero, this means that a protection device at P has a fault within its area of protection PQ of the line, i.e. an internal fault. By combining this information with information about the direction to the fault and about the faulty phase or faulty phases, if any, direct tripping of the circuit-breaker(s) in question can be effected. This means that a protection device for directional comparison can be provided with a direct-tripping operation mode, which is independent of a communication channel linking the stations P and Q which is included in the protective system.

PREFERRED EMBODIMENT

A device for carrying out a method according to the invention can be designed in accordance with FIG. 7. Phase currents and phase voltages in the station in which the protection device is located are supplied to a travelling wave model 1. In the example shown, the protection device is situated in station P, and consequently phase currents $i_{RP}$, $i_{SP}$ and $i_{TP}$ and phase voltages $u_{RP}$, $u_{SP}$ and $u_{TP}$ are supplied to the travelling wave model. If the protection device is specially made for a certain given line section or range, a simplified version of the travelling wave model, which only calculates the control voltage at the end point of the section, may be used. If the protection device is to be adjusted for different ranges, a travelling wave model with a possibility to calculate voltages at several control points must be used. This is exemplified by the outputs $u_p$ and $u_k$ of the travelling wave model.

The voltage differences $\Delta u$ as regards phase voltages, i.e. $\Delta u_{pqk}$ according to equation (6), are obtained by adding the voltage values of two consecutive half-periods. The time shift is obtained by means of time delay elements 2, 3 and 4 and the summation is obtained in summation members 5, 6 and 7.

The voltage differences $\Delta u$ with respect to the principal voltage, i.e. $\Delta u_{p\sigma qk}$ according to equation (7), is obtained by generating, in summation devices 8, 9 and 10, the difference between the respective phase voltages.

The voltage differences $\Delta u$ can also be conceived to be generated by comparing the voltage value for one period with the corresponding value existing during a preceding period. The time delay elements 2, 3 and 4 must then provide a displacement corresponding to the time T for a whole period. To generate the difference voltage $\Delta u$, the time-shifted value must then be supplied to the summation member with a negative sign. A device in accordance with this method is not shown in FIG. 7.

To generate the voltage differences $\delta u$ with respect to phase voltages, i.e. $\delta u_{pqk}$ according to equation (8), te numerical value of the $\Delta u_{pqk}$-values is first formed in numerical value generating units 11, 12 and 13 and the numerical value of the corresponding voltages one half-period earlier is formed in numerical value generating units 14, 15 and 16. The difference between the numerical values obtained according to equation (8) is then formed in summation members 17, 18 and 19.

To form the voltage differences $\delta u$ with respect to principal voltages, i.e. $\delta u_{p\sigma qk}$ according to equation (b 9), the numerical value of $\Delta u_{p\sigma qk}$ is first formed in numerical value generating units 20, 21 and 22. The value of $u_{p\sigma q(k-N/2)}$ is formed in summation members 23, 24 and 25 and the respective numerical values are formed in numerical value generating units 26, 27 and 28. The differences according to equation (9) between the numerical values obtained are then formed in summation members 29, 30 and 31.

The mean value generation of $\delta u$ with respect to phase voltages, i.e. $\overline{\delta u}_{pqk}$ according to equation (10), is obtained by adding, in summation members 32, 33 and 34, the value of $\delta u_{pqk}$ to a mean value of $\delta u_{pq}$ one sample earlier, i.e. $\overline{\delta u}_{pq(k-1)}$, and subtracting a value of $\delta u_{pq}$ one half-period eariler, i.e. $\overline{\delta u}_{pq(k-N/2)}$. The half-period time shift takes place in time delay elements 35, 36 and 37, and the time shift $\Delta t$ takes place in time delay elements 38, 39 and 40.

The mean value generation of $\delta u$ with respect to principal voltages, i.e. $\overline{\delta u}_{p\sigma qk}$ according to equation (11), is obtained by adding, in summation members 41, 42, and 43, the value of a $\delta u_{p\sigma qk}$ to a value of a mean value of $\delta u_{p\sigma q}$ one sample earlier, i.e. $\overline{\delta u}_{p\sigma q(k-1)}$, and subtracting a value of $\delta u_{p\sigma q}$ one half-period earlier, i.e. $\delta u_{p\sigma q(k-N/2)}$. The half-period time shift takes place in time delay elements 44, 45 and 46, and the time delay $\Delta t$ takes place in time delay elements 47, 48 and 49.

Now, if any of the mean values obtained is greater than zero, according to the above description of the invention, a fault is present within the range of supervision of the protection device. The comparison takes place in comparator elements 50, 51, 52, 53, 54 and 55, the Boolean output signals of which, DR, DRS, DS, DST, DT, DTR, are supplied to an "or"-element 56 which emits a signal DF when the protection device is to enter into operation.

The components included in the device, such as travelling wave model, summation members, comparison members, time delay elements, ect., can be formed as more or less integrated solutions designed to operate in accordance with analog or digital techniques.

What is claimed is:

1. A method for range limitation and direct tripping in connection with the protection of a power line (PQ) included in a multi-phase electrical power transmission system, in which, in a measuring station (P) near the power line, measurement is performed in each phase of current and voltage, and the measured values are supplied to a travelling wave model, located in the station, by means of which the voltage distribution at a number of control points along the line can be obtained, comprising:

a voltage difference Δu is formed as the sum of a voltage value U″, calculated for a control point at a certain time, and a corresponding voltage value U′ one time period earlier, a voltage difference δu is formed as the difference between the absolute value of the voltage difference Δu and the absolute value of the voltage U′ for the same control point, and the range for a protection device in the measuring station (P) is determined as the distance from the measuring point to the control point for which δu is equal to zero when a low resistance fault occurs at the corresponding point of the real transmission line.

2. A method according to claim 1, in which when the voltage difference δu for the control point becomes greater than zero, a signal is obtained for direct tripping of a protective circuit-breaker for the line section between the measuring station and the control point.

3. A device for range limitation and direct tripping in connection with the protection of a power line included in a multiphase electrical power transmission system, and for a control point Q, whereby the distance between P and Q constitutes the range of the device, the device comprises:

a first summation member adapted to form a voltage difference $\Delta u_{Rq}$ equal to the difference between an R-phase voltage, calculated with the travelling wave model, and the corresponding voltage one time period earlier, a second summation member adapted to form a voltage difference $\Delta u_{Sq}$ equal to the difference between an S-phase voltage, calculated with the travelling wave model, and the corresponding voltage one time period earlier, a third summation member adapted to form a voltage difference $\Delta u_{Tq}$ equal to the difference between a T-phase voltage, calculated with the travelling wave model, and the corresponding voltage one time period earlier, a fourth summation member adapted to form a voltage difference $\delta u_{Rq}$ equal to the difference between the numerical value $|\Delta u_{Rq}|$ and the numerical value $|u_{Rq}|$ one time period eariler, a fifth summation member adapted to form a voltage difference $\delta u_{Sq}$ equal to the differfence between the numerical value $|\Delta u_{SQ}|$ and the numerical value $|u_{SQ}|$ one time period earlier, a sixth summation member adapted to form a voltage difference $\delta u_{Tq}$ equal to the difference between the numerical value $|\Delta u_{Tq}|$ and the numerical value $|u_{Tq}|$ one time period earlier, a seventh summation member adapted to form a mean value $\overline{\delta u}_{Rq}$ of the voltage difference $\delta u_{Rq}$, an eighth summation member adapted to form a mean value $\overline{\delta u}_{Sq}$ of the voltage difference $\delta u_{Sq}$, a ninth summation member adapted to form a mean value $\overline{\delta u}_{Tq}$ of the voltage differ $\delta u_{Tq}$, a tenth summation member adapted to form a voltage difference $\Delta u_{RSq}$ equal to the difference between $\Delta u_{Sq}$ and $\Delta u_{Rq}$, an eleventh summation member adapted to form a voltage difference $\Delta u_{STq}$ equal to the difference between $\Delta u_{Tq}$ and $\Delta u_{Sq}$, a twelfth summation member adapted to form a voltage difference $\Delta u_{TRq}$ equal to the difference between $\Delta u_{Rq}$ and $\Delta u_{Tq}$, a thirteenth summation member adapted to form a voltage difference $u_{RSq}$ equal to the difference between values of $u_{Sq}$ and $u_{Rq}$ one time period before the respective Δu-values, a fourteenth summation member adapted to form a voltage difference, $u_{STq}$ equal to the difference between values of $u_{Tq}$ and $u_{Sq}$ one time period before the respective Δu-values, a fifteenth summation member adapted to form a voltage difference $u_{TRq}$ equal to the difference between values of $u_{Rq}$ and $u_{Tq}$ one time period before the respective Δu-values, a sixteenth summation member adapted to form a voltage difference $\delta u_{RSq}$ equal to the difference between the numerical value $|\delta u_{RSq}|$ and the numerical value $|u_{RSq}|$, a seventeenth summation member adapted to form a voltage difference $\delta u_{STq}$ equal to the difference between the numerical value $|\Delta u_{STq}|$ and the numerical value $|u_{STq}|$, an eighteenth summation member adapted to form a voltage difference $\delta u_{TRq}$ as the difference between the numerical value $|\Delta u_{TRq}|$ and the numerical value $|u_{TRq}|$, a nineteenth summation member adapted to form a mean value $\overline{\delta u}_{RSq}$ of the voltage difference $\delta u_{RSq}$, a twentieth summation member adapted to form a mean value $\overline{\delta u}_{STq}$ of the voltage difference $\delta u_{STq}$, a twenty-first summation member adapted to form a mean value $\overline{\delta u}_{TRq}$ of the voltage difference $\delta u_{TRq}$, a respective comparison element to compare the produced mean values with the value zero, and means to deliver a signal, via an "or"-element, indicating the occurrence of a fault within the range of the protection device when any of the mean value is greater than zero.

* * * * *